May 29, 1951 E. PRAIZNER 2,554,591

RADIO PAGING SYSTEM FOR VEHICLES

Filed March 1, 1945 4 Sheets-Sheet 1

INVENTOR
E. PRAIZNER
BY
E. V. Griggs
ATTORNEY

May 29, 1951 E. PRAIZNER 2,554,591

RADIO PAGING SYSTEM FOR VEHICLES

Filed March 1, 1945 4 Sheets-Sheet 2

INVENTOR
E. PRAIZNER
BY
E. V. Griggs
ATTORNEY

May 29, 1951 E. PRAIZNER 2,554,591

RADIO PAGING SYSTEM FOR VEHICLES

Filed March 1, 1945 4 Sheets-Sheet 3

INVENTOR
E. PRAIZNER
BY E. V. Griggs
ATTORNEY

INVENTOR
E. PRAIZNER
BY E. V. Griggs
ATTORNEY

Patented May 29, 1951

2,554,591

UNITED STATES PATENT OFFICE 2,554,591

RADIO PAGING SYSTEM FOR VEHICLES

Edward Praizner, Montclair, N. J., assignor to Bell Telephone Laboratories, Incorporated, New York, N. Y., a corporation of New York Application March 1, 1945, Serial No. 580,328

12 Claims. (Cl. 250—2)

This invention relates in general to communication systems and in particular to radio paging systems in which a single radio transmitting station can selectively signal one of a plurality of subscribing units.

The need has been recognized for a simple and inexpensive method of communication to enable vehicles en route from one point to another to receive signals indicating awaiting messages. Such a service is especially adapted for use by airplanes, boats, buses and trucks operated over extended routes and by professional persons such as doctors or salesmen to expedite the proper conduct of their business while traveling in their private vehicles. While radio calling or annunciator systems of the type disclosed in an article entitled "Radio Telephone Signalling," by Charles S. Demarest, Milton L. Almquist and Lewis M. Clement, Journal of the American Institute of Electrical Engineers, volume 43, March 1924, have been employed in ship to ship and ship to shore communication, and similar systems have been utilized for train dispatching and air-transport communication, the apparatus used for these purposes is in general somewhat expensive and cumbersome for the type of service primarily envisioned by the applicant.

In the copending application of R. K. Potter, Serial No. 569,347, filed December 22, 1944, now Patent No. 2,436,824, granted March 2, 1948, for Radio Paging for Vehicles, a radio selective calling system is disclosed which was developed primarily for use by motor cars and trucks, one embodiment of which operates as follows. A message for a calling-service subscriber is communicated by telephone or otherwise to an operator at a radio transmitter station. The operator then selectively signals the designated vehicle subscriber station whereupon some signal device at the subscriber's station, such as a lamp or a bell, referred to variously in the specification and claims as an "announcing device" or "signal annunciator," operates to notify the subscriber that a message awaits him. Thereupon he may communicate with the calling radio transmitter station by telephone at his earliest convenience to learn the message or to ascertain the telephone number of the person who initiated the call.

In the Potter system, broadcast receiving and clock equipment conventionally installed in the car dash-board is utilized as part of the call receiving apparatus of a subscribing unit. A switch is arranged to enable the subscriber to disconnect the loudspeaker at will from the broadcast receiver thereby cutting off program reception and to connect in its stead a clock-driven selector apparatus in order to place the receiver in condition for call reception. In a modified embodiment of the Potter system, the calling frequency carrier signals sent out by transmitter are audio-modulated to permit a larger group of subscribers to be served by a single call transmitter.

It is the principal object of the present invention to provide an improved selective calling or signalling system in which a larger number of subscribers may be conveniently accommodated than in prior systems.

A second object of this invention is to provide a selective signalling system comprising units the operation of which is not too seriously affected by the vibration normally encountered in vehicle travel.

A third object of this invention is to provide automatic means interrupting broadcast reception and substituting call reception in its stead in the subscribing units of a radio paging system.

To attain the objects set forth, several call transmitting and receiving circuits are provided in which step-by-step selector mechanisms replace the clock-driven selector units utilized in Potter's selective signalling system. In addition, circuits are utilized in which broadcast reception is automatically cut off in response to received signals from the calling transmitter and call reception initiated in its stead.

In the selective signalling system of the present invention the transmitting unit is located in a central station from which calling signals are broadcast to subscribing units which may be located in vehicles such as motor cars and trucks. The calling signals are pulsed in accordance with the stepping of a selector mechanism in the transmitting unit. The transmitting operator manually controls operation of the selector mechanism by means of a conventional telephone dial on which she dials the number of the designated local station.

In each of the subscribing units, selector mechanisms are caused to move simultaneously through a number of steps which correspond to the number of pulses of calling carrier frequency received from the transmitter. A signal device in each of the subscribing units is designed to operate after its selector has moved through a given number of steps corresponding to a dial number chosen uniquely for that subscribing unit. Thus, in the called unit, the lighting of a signal lamp apprises the driver of a message awaiting him at the central station. He may then learn the message by telephoning through ordinary channels.

In systems employing selector equipment at a plurality of stations to be selected it is ordinarily necessary after a selecting operation to insure that the equipment at each station be returned to a normal position or condition at which it is ready for a new selecting operation. In order to do this, each equipment may be provided with some restoring device which will automatically effect the restoration. In systems of the present invention it is desired to reduce to a minimum the apparatus required at each subscriber's station in order to bring its original cost and its maintenance down to a low figure. Accordingly, applicant dispenses with constantly rotating motors and other synchronizing devices and also with restoring-to-normal apparatus. In lieu of this, there is used a simple step-by-step selector of the type disclosed in the United States patent to Albert 2,248,212, July 8, 1941. Restoring to normal may be effected by transmitting an uninterrupted signal from the calling transmitter for a definite duration prior to and at the end of each station selection. This signal may either be a steady signal of calling carrier frequency of the proper duration or a continuous interruption in the calling carrier signal, according to whichever system the relays in the subscriber's units are adapted to respond. In the specification and claims hereinafter, a positive pulse of calling carrier frequency will be referred to as a mark pulse, while an interruption in the steady calling wave will be referred to as a space pulse.

Additional objects and features of the invention will be apparent upon condiseration of the following specification taken in connection with the appended drawings in which.

Figures 4, 5:
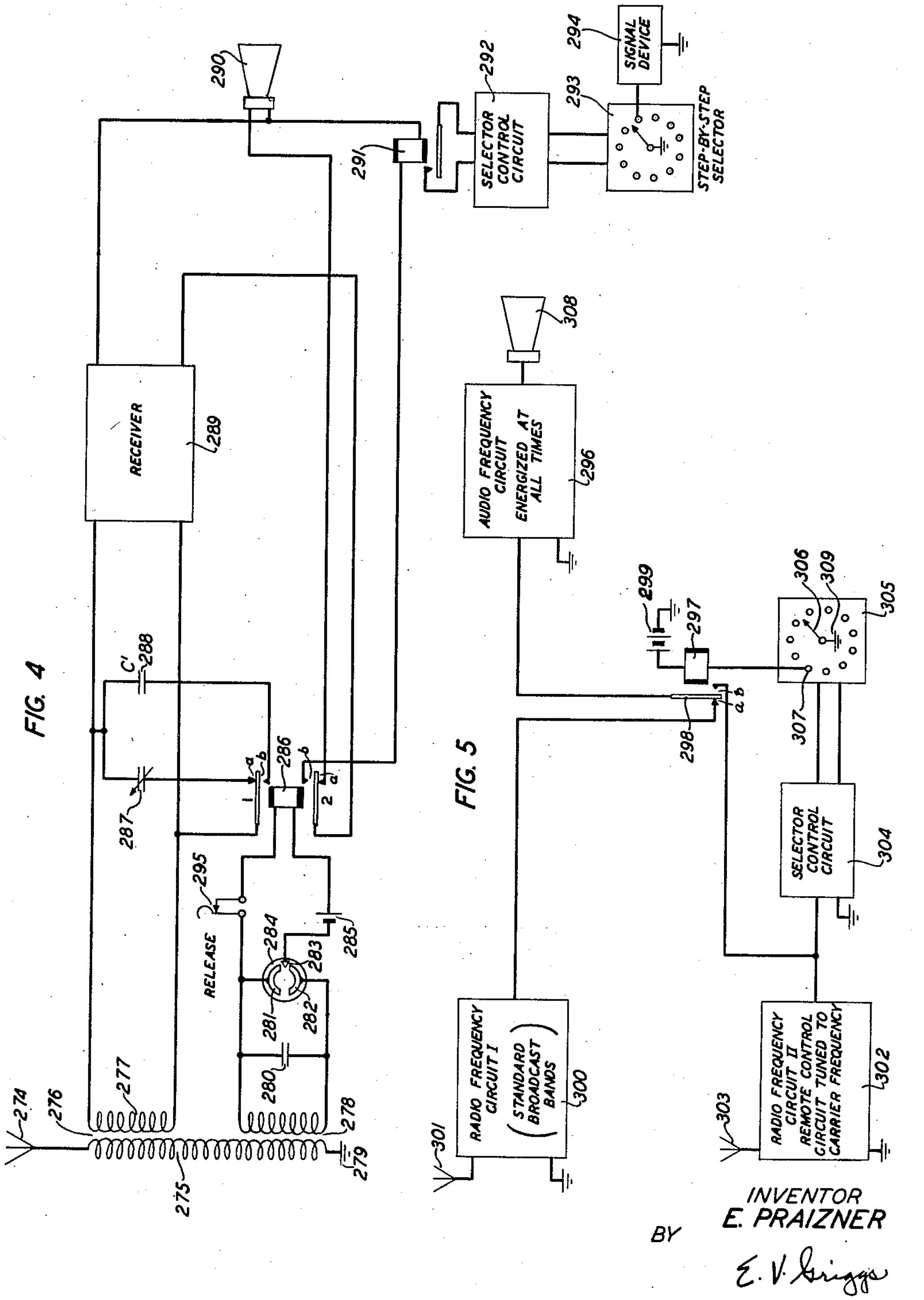
Fig. 4 shows a receiving circuit for a radio paging system in which broadcast reception is automatically discontinued and call reception initiated upon receipt of a pulse of calling carrier frequency.
Figures 2, 6:
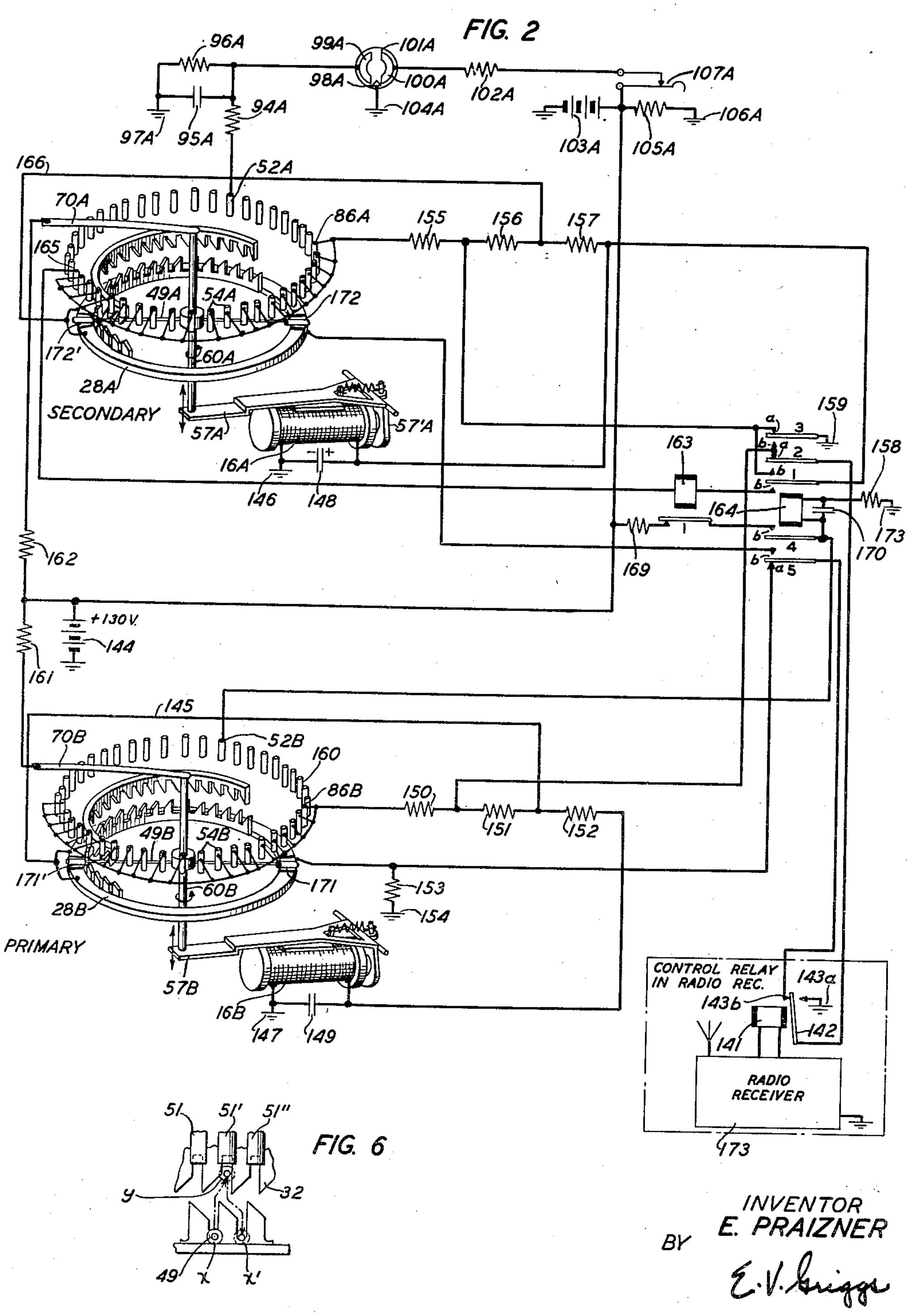
Fig. 2 shows an embodiment of a subscriber's receiving unit adapted for a two-digit radio paging dial system in which the stepping of the selector mechanism is brought about by relay operation in response to received pulses.

Fig. 5 shows a circuit in which broadcast reception is automatically discontinued and call reception initiated by means of a radio frequency unit tuned to the calling carrier frequency which acts through the selector mechanism to energize a relay to substitute the selector mechanism and control circuit for the conventional radio frequency circuit of a broadcast receiver; and Fig. 6 shows a detailed diagram illustrating the movement of a selector arm through the upper and lower combs of teeth in the Albert-type step-by-step selector mechanism employed in the transmitting and receiving circuits of the selective calling system.

Figure 1:
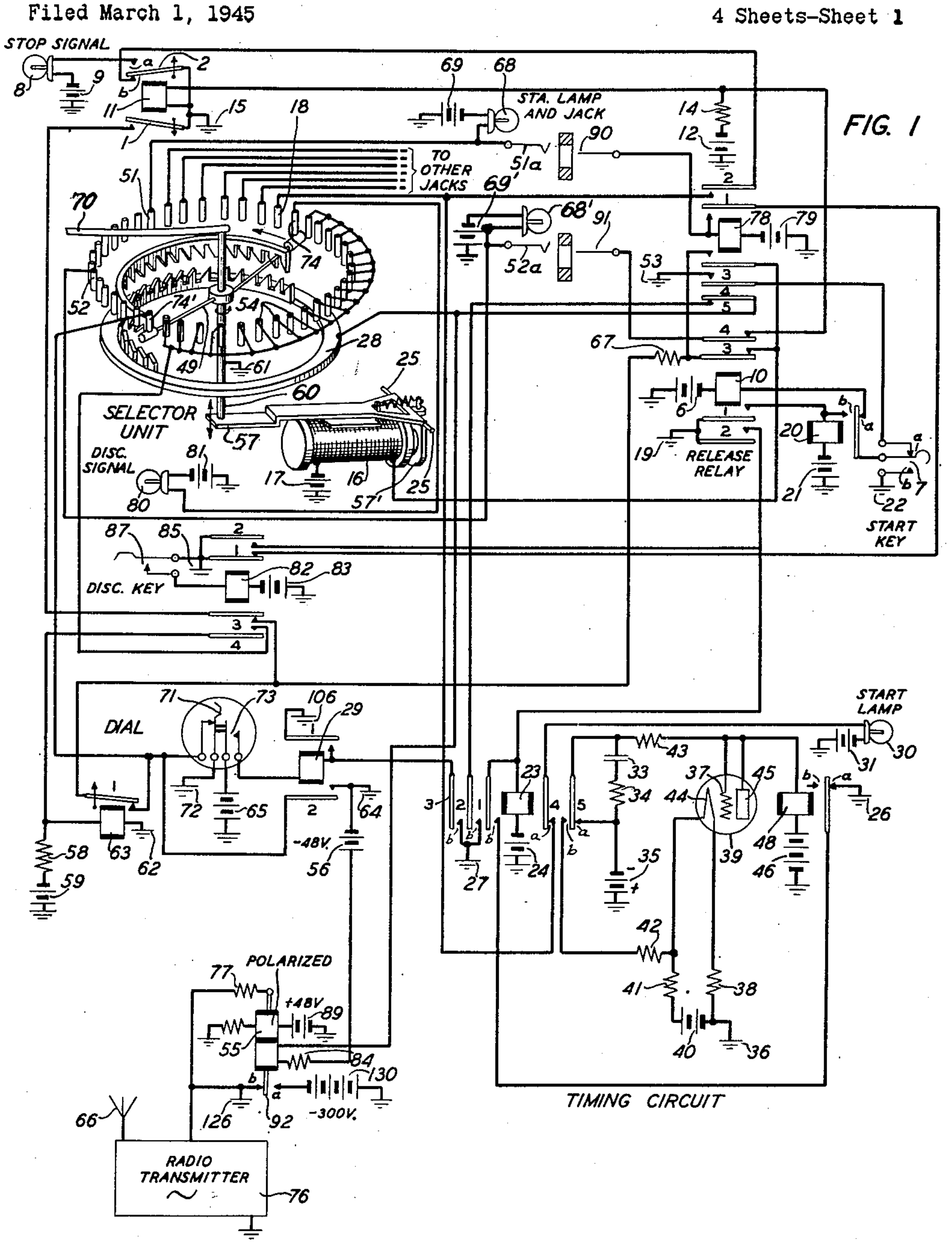
Fig. 1 shows one embodiment of a transmitting unit for a two-digit radio paging dial system which includes a step-by-step selector mechanism in circuit arrangement according to this invention.

The transmitting equipment of Fig. 1 comprises generally a step-by-step selector shown in the upper left-hand portion of the figure; a start key for initiating the operation of returning the selector apparatus in the subscribing stations to normal before initiation of a call from the transmitter; a radio transmitter controlled through the start key to send out a steady signal to restore the selectors at the subscribers' stations, and responsive to the movements of the step-by-step selector to send pulsed signals to the subscriber's station; a timing circuit, the operation of which is initiated by the start key to determine the duration of the steady signal sent out by the radio transmitter; a dial for calling subscribers' stations, a disconnect key for returning the systems to normal after a call has been made, and various associated supervisory and auxiliary apparatus and circuits. Among these are the station lamp 68 which lights up to indicate when the number of a subscribing station has been correctly dialed, the stop signal 8 which remains lighted until the connection for a called station is cleared, the disconnect signal 80 which lights up when the selector arm reaches its resting position, and the respective relays, which assist the selector mechanism in initiating various operations.

Figure 3:
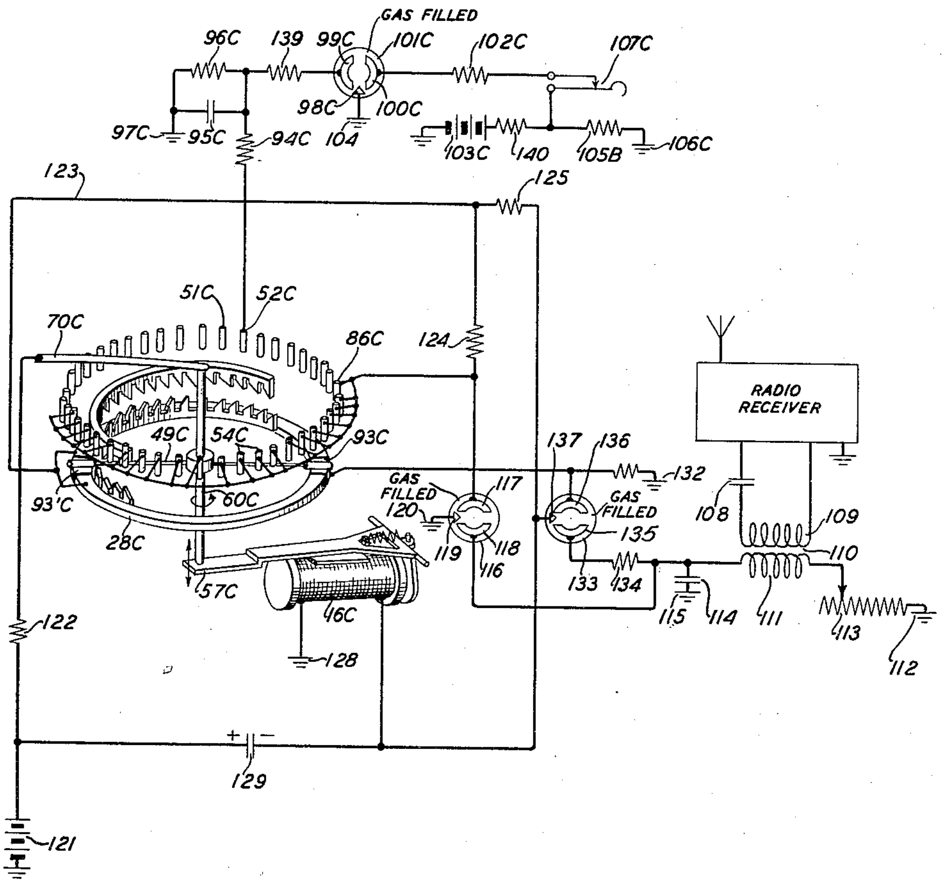
Fig. 3 shows an embodiment of a subscriber's receiving unit adapted for a one-digit radio paging dial system in which stepping of the selector mechanism is brought about by an arrangement of cold cathode tubes which are rendered conducting in response to received pulses.

Before preceding further with the discussion of the circuits, it seems expedient to describe briefly the type of selector unit which the applicant uses in preferred embodiments of his invention both in the transmitting and receiving circuits. Details of this type of selector unit are shown in Figs. 3 and 4 of Patent 2,248,212 issued July 8, 1941 to W. P. Albert. The selector unit used in these embodiments and described herewith comprises two circular combs of pointed teeth 32 arranged in cylindrical alignment with the teeth of the upper comb in offset relationship to those of the lower comb as shown in Fig. 6. The selector arm or contact wire 49 which is shown in cross-section in Fig. 6 and in perspective in the diagrams of Figs. 1, 2 and 3, moves as indicated by the arrows in counter-clockwise rotation when viewed from the top of the selector in alternate steps shuttling vertically between the lower and upper combs of metallic teeth 32 which are insulated from the selector arm 49. The motion takes place as follows. The selector arm 49 is secured to a rotatable shaft 60 which is capable of moving also in the direction of its length. Shaft 60 is normally held in a downward position against the operating lever 57 of the electromagnet 16 by the spring 70. Lever 57 is pivoted at 25. When the electromagnet 16 is deenergized, the enlarged contactor at each end of selector arm 49 (see Fig. 6) rests in position $x$ in a slot between two adjacent teeth on the lower comb. The selector arm 49 is simultaneously in electrical contact with the lower conducting ring 28. Energization of the electromagnet 16 causes it to attract the armature 57′ which is an integral right angled extension of the operating lever 57, thereby moving the supporting shaft 60 of the selector arm 49 axially upward against the tension of the spring 70, whereby the selector arm 49 is caused to engage the inclined surface of the contiguous one of the upper row of teeth. The arm 49 then slides forwardly with clockwise direction and upwardly along the inclined face of the tooth until it comes to rest in a slot, as shown in position $y$ of Fig. 6. When the selector magnet 16 is again deenergized, the restoring spring 70 impels the shaft 60 downward and so moves the arm 49 through the next successive half-step to the position $x'$ into a slot between two adjacent teeth on the lower comb. In this position, the selector arm 49 again engages the conducting ring 28. In this manner at each energization of the magnet 16 the shaft 60 shuttles toward the upper comb and back to the lower comb when the magnet deenergizes. Each such axial motion of the shaft causes it to advance angularly in counter-clockwise direction. The contacts 51, 51′ and 51″ shown in Figs. 1 and 6, are so positioned with respect to slots in the upper row of teeth that the selector arm makes electrical contact with each one of them when engaging its corresponding slot, simultaneously engaging one of the contacts 54 diametrically opposite on the upper comb of teeth.

The operation of signalling to one of the subscribing stations that a message for it has been received and of restoring the apparatus in the transmitting and subscribing stations to normal may now be traced by reference to Fig. 1 which represents a radio call transmitting station and Figs. 2 and 3, which represent different types of radio call receiving systems for use by subscribers. Between calls, the selector mechanism and associated relay circuits ordinarily assume the positions shown in Figs. 1, 2 and 3 of the drawings.

Referring to Fig. 1, assume that a request has been received at the transmitting station to call a particular subscriber's station. Before proceeding with the dialing operation, the operator's first step is to ascertain that all of the selectors in the subscribers' stations are returned to their normal positions. This is accomplished by sending out from the transmitter a prolonged space pulse, at the end of which the start light is operated to indicate to the operator that all of the subscribers' circuits are in condition for the dialing operation.

In order to bring about these operations, the operator first depresses the start key 7, thereby closing the circuit from the ground 22 through the windings of the release relay 10 which is energized by the battery 6. Thus energized, the relay 10 actuates its armatures 1, 2, 3 and 4 with the following results.

The number 1 armature of the relay 10 pulls up closing its contacts and thereby completing circuit to ground 19 of the locking relay 20 from its energizing battery 21. The armature of the relay 20 is thus attracted, breaking its *a* contact and engaging its *b* contact, thereby opening the circuit of the relay 10, causing it to become and remain deenergized, even though the start key 7 remains depressed.

The number 3 armature of the relay 10 pulls up breaking its contact, and thereby breaking the path from the selector magnet 16 and its energizing battery 17 through the 350-ohm resistance 67 and the armature 1 of the relay 63 to ground 72. The selector arm 49 is thus released from locked engagement with resting contacts 74 and 74′ to drop down in contact with the lower conducting ring 28. As soon as the relay 10 is deenergized, the armature 3 again engages its contact, connecting the circuit of the selector magnet 16 to ground 72, so that the selector arm 49 is reactuated to step up to engage the home contact 18, where it remains locked in position.

The number 4 armature of the relay 10 pulls up breaking its contact. However, at this point in the operation, no action occurs since the secondary plug 91 to which this armature is connected has not yet been placed in the corresponding jack 52*a*.

The number 2 armature of the relay 10 pulls up, closing its contact for the instant the relay 10 remains energized, and initiating operation of the timing circuit in the following manner. The ground 19 is applied through the relay 23 and its associated battery 24, causing relay 23 to become energized. The relay 23 is immediately locked in operation over a circuit which includes the source 24, the winding of the relay 23, its armature and contact 1, and ground 26, so that it remains energized after the release relay 10 has become deenergized.

When the armature and contact 2 of the relay 23 pulls up, a space signal is initiated in the transmitting circuit in the following manner.

Closure of the armature and contact 2 of the relay 23 applies the ground 27 to the circuit of the relay 55, which includes the energizing battery 56. The circuit from the ground 27 to the relay 55 passes around through the number 5 armature and its contact of the relay 78, which remains closed while the relay 78 is deenergized. The relay 55 actuates its armature 92 to break its *b* contact to ground 126 and engage its *a* contact, thereby applying a negative bias of 300 volts from the source 130 to the circuit of the transmitter 76, thereby rendering the transmitter 76 inoperative.

The duration of the space pulse, which is transmitted for the purpose of returning the selector arms in the subscribing circuits to their home positions, is fixed by the constants of the timing circuit described hereinafter.

When the armature 3 of the relay 23 pulls up engaging its contact, the ground 27 is applied to the circuit of the dial cut-off relay 29. As long as the dial remains in a normal unoperated position, the relay 29 is deenergized, since the circuit to its energizing source, the battery 65, is open at the contact 73. However, should the dial be moved to an off-normal position while the relay 23 is energized, that is while the timing circuit is running its course and the steady carrier signal is being interrupted, the contact 73 immediately closes the energizing circuit of the dial cut-off relay 29, actuating its 1 and 2 armatures to close their respective contacts, thereby locking the relay 29 in operation through its ground 106 as long as the dial is off-normal, and short-circuiting the ground contact 72 by means of the connection to ground 64, so that dial pulses cannot be sent out.

The armature 4 of the relay 23 pulls up breaking its contact and opening the circuit of the start lamp 30 which is energized by means of the battery 31, so that it cannot light before the timing circuit has run its course.

The armature 5 of the relay 23 pulls up breaking its *a* contact and closing its *b* contact, initiating operation of the timing circuit as follows. Before the relay 23 is energized, the grid 37 of the three-element tube 39 is maintained at a negative potential with respect to ground by the battery 35, which charges the grid by way of the armature 5 engaged with its *a* contact. This potential is below that corresponding to current cut-off for the tube 39. After the armature 5 is attracted to its contact *b* transferring the unidirectional current connection of the grid 37 from the negative terminal of the battery 35 to the positive potential side of the circuit of the cathode heating source 40, the grid 37 gradually assumes a positive potential. The interval which elapses while the grid 37 changes from negative to positive, and the magnitude of the positive potential finally assumed by the grid 37 is determined by the voltage of the filament heating source 40, the values of the resistors 41, 42, 43, which are fixed for expedience at 1000, 2.7, and 1 ohms respectively, and the capacitance of the condenser 33, about 1 microfarad, in series with the 1000 ohm resistance 34.

When the potential of the grid 37 becomes sufficiently positive, the tube 39 is rendered conducting so that current passes from the plate 45 to the filament 44 to operate the relay 48 in the plate circuit. Operation of the relay 48 actuates its armature 1 to break its *a* contact and engage its *b* contact disconnecting the ground 26 from the circuit of the relay 23, thus releasing the armatures 1, 2, 3, 4 and 5 to their normal positions as shown in Fig. 1 of the drawings.

As soon as the cycle of the timing circuit runs its course, permitting the relay 23 to become deenergized by breaking its contact to ground 26 as described, and the armatures 1, 2, 3, and 4 of the relay 23 are returned to their normal positions as shown in Fig. 1, the selector arm 49 closes ground 61 to multiple contacts 54 which perform no useful function at this time, and also to contact 18, armature and contact 4 of relay 23 to lamp 30 and battery 31 lighting the start dialing lamp. The circuit is then in condition for the initiation of a call by the transmitting operator.

Assume the operator initiates a call to a subscribing station having a two-digit number, for example, 87, the transmitting operator first inserts the primary plug 90 in the jack 51*a*, which corresponds to the tens digit in this case the numeral 8, and then the secondary plug 91 in the jack 52*a* which corresponds to the units digit, in this case 7. The primary jack 51*a* connected to contact 51 and corresponding to the numeral 8*a* is located by counting eight contacts in a counter-clockwise direction from the selector home contact 74. The secondary jack 52*a* is located by counting seven contacts in the same direction, starting from the primary contact 51. Connected to the circuit of each jack is a separate station lamp corresponding to the lamp 68 for the jack 51*a*, the function of the station lamps being to indicate whether the code number of a particular subscriber's station has been correctly dialed.

The operator next dials the tens digit by moving the conventional telephone dial 71 to the position of the numeral 8.

When the dial is moved to an off-normal position, the contacts 71 remain closed during the counter-clockwise swing of the dial. During the clockwise swing, when the dial is returning to the normal position, the contacts 71 make and break engagement a number of times depending on the number dialed in this case, eight. Although the contacts 73 are closed when the dial is off-normal, the dial cut-off relay 29 remains deenergized, since the circuit to ground 27 remains open after the timing circuit has ceased to function.

When the dialing begins, the selector arm 49 is in engagement with the starting position 18 on the upper ring. Through dial action, the first breaking of the contacts 71 opens the circuit of the selector magnet 16 to ground 72, thereby deenergizing the selector magnet 16 and releasing the selector arm 49 to drop down to the succeeding slot on the lower comb of teeth to make contact with the conducting ring 28. When the dial contacts 71 again engage, closing the circuit of the selector magnet 16 to ground 72, the selector magnet 16 reenergizes through the circuit previously described, actuating the selector arm 49 to move to the next succeeding slot on the upper comb of teeth, engaging the corresponding contact. The alternate making and breaking of the dial contacts 71, which occurs at a fast enough rate so that the delayed action relay 63 does not operate, continues until the selector arm 49 steps around to the contact 51 on the upper comb, which corresponds to the numeral eight, representing the tens digit in the number of the called station.

In its shuttling motion from the home position 18 to the contact 51, the selector arm 49 engages the lower conducting ring 28 a number of times corresponding to the number of steps between these two positions. Each time the selector arm 49 drops down to engage the lower conducting ring 28, the ground 61 is applied to the circuit of the relay 55, thereby causing it to energize and attract its armature 92, applying a negative bias of 300 volts to the transmitting circuit, whereby a space pulse is transmitted. The number of space pulses sent out by the transmitter thus corresponds to the number of steps through which the selector arm 49 is caused to move by dial operation.

When the selector arm 49 engages the contact 51, the following circuits are energized. The ground 61 is applied through the selector arm 49 and the contact 51, thereby causing the station lamp 68 to be energized by the battery 69. This indicates that the primary number has been correctly dialed. Ground 61 is also applied through the contact 51 and the primary plug-jack combination 90—51*a* to energize the circuit of the relay 78 through the battery 79. The relay 78 then pulls up its armatures 1, 2, 3, and 4 with the following results.

The number 1 armature engages its contact, theerby applying the ground 85 to the circuit of the relay 78, locking it in operation after the ground 61 is removed.

The number 4 armature of the relay 78 engages its contact, thereby applying the ground 53 to the circuit of the relay 10, causing it to energize and pull up its armatures 1, 2, 3 and 4, which operate as described hereinbefore. The number 1 armature of the relay 10, applies the ground 19 to the circuit of the relay 20, causing it to break its *a* contact and make its *b* contact, thus breaking the circuit of the relay 10, so that it only remains energized momentarily. During the instant in which the relay 10 is energized, its number 2 armature engages its contact, thereby applying the ground 19 to the circuit of the relay 23, which locks in operation and initiates operation of the timing circuit as hereinbefore described. No action occurs at this time from the pulling up of armatures 3 and 4 of the relay 10.

The number 3 armature of the relay 78 pulls up engaging its contact and thereby maintaining the connection between the energizing circuit of the selector magnet 16 and the ground 72, whereby the selector arm 49 remains locked on the contact 51.

The number 2 armature of the relay 78 pulls up engaging its contact. The ground 15 is thereby applied through the number 2 armature and its *b* contact of the relay 11, the number 2 armature and contact of the relay 78, and the number 4 armature and contact of the relay 23 to the circuit of the start lamp 30 so that when the timing circuit completes its cycle and the relay 23 deenergizes as hereinbefore described, the start light 30 will light to indicate a condition for the dialing of the second digit.

The number 5 armature of the relay 78 pulls up breaking the circuit through the number 2 armature of the relay 23 to the ground 27, and thereby disconnecting the relay 55 from the timing circuit and preventing a steady space pulse from being transmitted for the duration of the time cycle as in the previous operation of the timing circuit which occurred before dialing began.

The operation of the timing circuit permits a suitable interval to elapse between the transmission of the primary and secondary pulses so that the subscribing units are properly conditioned to receive the secondary pulses.

When the start light reappears the operator dials the units digit in the subscriber's number by moving the conventional telephone dial 71 to the position of the numeral 7, in the case under description. As described hereinbefore, the contacts 71 alternately make and break contact to ground 72 intermittently energizing the selector magnet 16 so that the selector arm 49 steps around from contact 51 to contact 52 as hereinbefore described with reference to the primary dialed number. As explained before, a space pulse is transmitted each time the shuttling selector arm 49 drops down to engage the conducting ring 28 intermittently applying the ground 61 to the transmitter circuit so that the total number of space pulses transmitted as the selector arm 49 steps from contact 51 to contact 52 are equal to the unitary digit in the subscriber's number.

When the selector arm 49 engages the contact 52 on the upper comb of teeth the following circuits are energized:

The station lamp 68' is energized when the ground 61 is applied through the contact 52 to its circuit thus indicating that the secondary digit has been correctly dialed. Simultaneously, the ground 61 is applied through the contact 52, the secondary plug 91 and jack 52*a*, the number 4 armature and its contact of the relay 18 thereby short-circuiting to ground the winding of the relay 11. The relay 11 is thus deenergized causing its number 2 armature to drop back, breaking its *b* contact and engaging its *a* contact thus connecting the ground 15 to energize the stop signal 8 through the battery 9. At the same time the number 1 armature of the relay 11 drops back engaging its contact and thereby applying ground 15 through the armature and contact 3 of the relay 82 to close the energizing circuit of the selector magnet 16, thereby locking the selector arm 49 on the contact 52.

When this operation is completed and the transmitting operator wishes to return the selectors in the transmitting and subscribing stations to their rest positions, she then operates and holds operated the disconnect key 87. This closes the circuit of the relay 82 and its energizing battery 83 to ground 85 causing its armatures 1, 2, 3 and 4 to pull up with the following results:

The number 1 armature of the relay 82 breaks contact to ground 85 which has been applied through the number 1 armature of the relay 78 to lock it in operation. The relay 78 thus deenergizes, releasing its armatures 1, 2, 3, 4 and 5 to their normal positions as shown in Fig. 1 of the drawings.

The number 2 armature of the relay 82 closes its contact thereby applying the ground 85 to the circuit of the relay 23, whereby the relay 23 energizes and pulls up its armatures 1, 2, 3 and 4 to engage their respective contacts, initiating operation of the timing circuit, locking out the dial contacts, and causing a steady space pulse to be transmitted to subscribing stations as hereinbefore described.

The number 3 armature of the relay 82 releases, breaking contact between ground 15 and the circuit of the selector magnet 16.

The number 4 armature of the relay 82 engages its contact, thereby connecting the common conductor of the contacts 54 to the juncture between the resistance 58 and the relay 63. The contacts 54 are electrically interconnected and so arranged that one of them is always engaged whenever the selector arm 49 is in position on the upper comb of teeth.

As soon as the number 4 armature of the relay 82 operates as described, the winding of the relay 63, which has previously been energized by current from the battery 59 passing through the resistance 58, is short-circuited to ground 61 through a path which includes one of the contacts 54 on the upper ring and the selector arm 49. When the relay 63 becomes deenergized its slow-release armature is actuated thereby breaking connection to ground 72 of the selector magnet 16 thus causing the arm 49 to drop down to engage the lower ring 28. As soon as the selector arm 49 drops down removing the ground 61 from the circuit of the contacts 54, the relay 63 is again energized by current from the battery 59 so that it actuates its number 1 armature restoring the ground 72 to the circuit of the selector magnet 16 causing that magnet to reenergize. The selector arm 49 is thus actuated to move up to the next position on the upper comb of teeth, engaging another one of the contacts 54. This operation is repeated until the selector arm 49 reaches its resting position on the upper comb, engaging the diametrically opposing contacts 74 and 74' on its opposite ends. The disconnect lamp 80 is energized when its circuit including the battery 81 is connected through the contact 74 and the selector arm 49 to ground 61 thus indicating that the selector arm 49 has returned to its resting position. Simultaneously, the ground 61 is applied through the contact 74 to the common terminal between the armature 1 of the relay 63 and the armature 2 of the relay 29. Thus the dial contacts remain locked out of operation as long as the selector arm 49 remains on the contacts 74, 74' where it is locked in position until the start key 7 is again depressed in order to initiate a new call.

Although the transmitting system shown in Fig. 1 is specifically designed to transmit signals in a two-digit dial system to receiving units having two selectors in cascade, such as shown in Fig. 2, it is also possible to transmit a one-digit dial signal for receiving units of the single selector type such as shown in Fig. 3. In order to call a single selector subscribing unit the secondary plug 91 is initially placed in a jack corresponding to the number of the called station. The start key 7 is depressed initiating operation of the timing circuit as before. When the start signal lights the single digit is then dialed by the operator and the selector arm 49 steps around to the designated contacts energizing the stop signal 8 and the corresponding station lamp while simultaneously the required number of pulses is transmitted to the receiving units. The selector arm 49 is returned to its resting position as hereinbefore described.

Although the transmitting unit shown in Fig. 1 embodies a single selector adapted to send out two time separated trains of space pulses for a two-digit system it is obvious that two separate selectors could be substituted. Furthermore, the number of digits in the subscriber's designating numbers in any particular selective calling system might be made three or four or more by the use of additional selectors in sending and receiving units. In the case of each particular calling system, the number of selectors connected in cascade in each of the annunciator circuits corresponds to the number of digits in the call designation of each subscriber's station. Hence, according to this invention, the number of subscribing units which can be serviced by one transmitting station is practically unlimited.

Although at present designed to send space pulses, a slight change in the transmitting circuit would condition it to transmit mark pulses as described hereinbefore. However, space pulses are preferable since by their use the possibility of chance operation of the selector by stray pulses is greatly minimized.

In the receiving systems shown the circuit of Fig. 2 is designed to respond to space pulses while the system of Fig. 3 is designed to respond to mark pulses. It is obvious that only a slight circuit change is necessary to convert any one of these systems from space to mark response or vice versa.

Instead of signals of interrupted carrier wave described with reference to the embodiments herein shown, single-tone, two-tone or carrier frequency shift signals, commonly known in the telegraph art, may be employed with slight circuit modification on either an amplitude modulated or frequency modulated basis.

In the call receiving units shown in Figs. 2 and 3 the radio frequency calling signals are first detected and amplified in conventional radio receiving equipment before actuating a selector in one of the alternative units shown. The selector units in each of the alternative call receiving apparatus shown are identical in operating detail with the selector mechanism shown and described with reference to the transmitting circuit of Fig. 1. In order to bring this correspondence clearly to the attention of the reader, parts having identical functions in the respective selector circuits are marked with the same numerals but have respectively different identifying capital letters in each receiving selector circuit.

Fig. 2 of the drawings shows a receiving circuit which responds to the two-digit dial signal of the sending circuit of Fig. 1. In the circuit of Fig. 2 two selector mechanisms are placed in cascade enabling a single selective signaling system to accommodate 441 subscribing stations. By means of this receiving circuit certain practical difficulties are eliminated, namely, undue drain on the car battery and the possibility of a wrong number being selected should stray pulses of the calling carrier frequency be received during the idle period.

In the space signal operation used in this circuit, as hereinbefore described, an expedient over-all pulse length has been found to be 84 milliseconds. The time division of this over-all pulse into mark and space portions depends on which type of pulse the receiving circuits are designed to respond to. In the circuit of Fig. 2 a preferred duration for transmitted space pulses has been found to be between 24 and 45 milliseconds.

In space signal operation the relay 141 is normally energized by a steady carrier signal sent out by the transmitter and detected and amplified in the receiver of the subscribing unit. Interruptions in the steady transmitted carrier signal constituting space pulses as described hereinbefore cause the relay 141 to deenergize, releasing its armature 142 to engage the ground contact 143*a*. Although with slight circuit adjustments either type signal may be used in any of the systems shown, the space signals are preferable in that chance operation of the selector from stray pulses of carrier frequency is thereby minimized.

In the system of Fig. 2 under normal conditions both the primary and secondary selector arms remain on their home positions between calls. However, in case an accident such as the interruption of the battery supply has moved the primary selector arm 49 to a position other than the home contact, i. e., contact 160, a steady space signal of the calling carrier signal is transmitted before the dialed signals in order to return the primary selector arms in all of the subscribing units to their respective home positions. The steady space signal deenergizes the relay 141 permitting its armature 142 to drop back making contact with the ground 143*a* which is thus applied through the number 2 armature and its *a* contact of the relay 164 to the common terminal of the 5,000-ohm resistance 150 and the 560-ohm resistance 151. The primary and secondary selector units of Fig. 2 are of the Albert type and operate in a similar manner to the selector of Fig. 1. Current from the battery 144 is conducted through the 450-ohm resistance 161, the spring 70B, the shaft 60B, selector arm 49B, contact 54B, and resistance 150 to ground 143*a* thus shunting out the circuit of the selector magnet 16B. The primary selector magnet 16B deenergizes, releasing the arm 49B to drop down to the next succeeding step on the lower conducting ring 28B. When the selector arm 49B is in position on the lower ring, current passes from the battery 144 through the resistance 161, spring 70B, shaft 60B, ring 28B and through the outer conductor 145 to the common terminal of the 560-ohm resistance 151 and the 500-ohm resistance 152 where approximately half the current goes to again energize the circuit of the selector magnet 16B. As soon as the selector arm 49B is again raised into position against one of the contacts of the upper ring the circuit of the selector magnet 16B is again shunted through ground contact 143*a*. This operation is repeated as long as the steady signal deenergizes relay 141 and until the selector arm 49B reaches its resting position 171 on the lower ring. The battery current is then connected through the selector arm 49B and contact 171 to the 17,000-ohm bleeder resistance 153.

When the relay 141 restores to its normal energized condition at the end of the steady signal, attracting its armature 142 thus breaking ground contact 143*a*, and engaging contact 143*b*, the selector magnet 16B is again energized over a circuit from the battery 144 including the resistance 161, spring 70B, selector arm 49B, the contact 171, the number 5 armature and its *a* contact of relay 164, the armature 142 of the relay 141 in position 143*b*, the number 2 armature and its *a* contact of the relay 164, resistances 151 and 152. The selector arm 49B is thus actuated to step up to its starting position 86B in preparation for the dialing.

Assume that the transmitting operator has dialed the primary or tens digit 8 in the designating number 87 of the called station, as previously described with reference to the transmitting circuit.

The first of the series of primary dial signals deenergizes the relay 141 causing the ground 143a to be applied to the common terminal of the resistances 150 and 151 thus shunting out the circuit of the selector magnet 16B as described above and releasing the selector arm 49B to drop down to the next succeeding step on the lower ring 28B. As soon as the space pulse ceases, the relay 141 returns to normal energized state breaking engagement with ground contact 143a so that all but an inappreciable part of the current from the battery 144 passes through the ring 28B, its outer conductor 145 and the resistance 152 to again energize the circuit of the selector magnet 16B thus stepping the selector arm 49B up to the next position on the upper ring of contacts.

This operation continues in accordance with the number of dialed pulses until the selector arm 49B in the called station is stepped up to the switching contact 52B which in this case would be the eighth contact in a counter-clockwise direction counting from the home contact 86B. The selector arm 49B then closes the circuit of the battery 144 through the contact 52B to charge up the condenser 170 and energize the relay 164. The presence of the condenser 170 precludes the operation of the relay 164 when the selector arm 49B passes over the relay contacts in other than the called station since a definite potential must be built up across the terminals of the condenser 170 in order to operate the relay 164.

When the relay 164 energizes it lock-operates as follows: The number 4 armature of the relay 164 is actuated to close its *b* contact thereby furnishing a path for current from the battery 144 through the 2,200-ohm resistance 169 and the armature 1 of the cut-off relay 163 to the circuit of the relay 164 thus locking it in operation under control of the cut-off relay 163. At the same time the number 3 armature of the relay 164 is actuated to engage its *b* contact, thereby applying the ground 159 to the common terminal of the resistances 150 and 151 of the primary selector.

This shunts out the circuit of the selector magnet 16B releasing the selector arm 49B to drop down to the next succeeding step on the lower ring again reenergizing the circuit of the selector magnet 16B. The selector arm 49B of the primary selector thus steps around to its home position 171, 171′ in the manner described hereinbefore. Since the number 5 armature of the relay 164 has been actuated to break its *a* contact and engage its *b* contact, the selector arm 49B when resting on its home position 171, connects the battery 144 to ground 154 through the bleeder resistance 153 to stabilize the "B" battery voltage.

Actuation of the number 2 armature of the relay 164 breaking its contact *a* and engaging its contact *b* transfers the pulsing leads under the control of the relay 141 from the primary selector circuit to the secondary selector circuit.

When the armatures 2 and 5 of the relay 164 are actuated to engage their respective *b* contacts, the selector magnet 16A is energized and held operated through a circuit which includes the battery 144, resistance 162, spring 70A, shaft 60A, selector arm 49A, home contact 172, contact 5*b* of relay 164, operated contacts 143*b* and 142 of the relay 141, contact 2*b* of the relay 164 and resistances 156 and 157 to relay winding 16A to ground 146 operating the selector from position 172 to start position 86A. The resistances 156 and 157 have magnitudes of 560 and 500 ohms respectively, whereas the resistance 155 has a magnitude of 5,000 ohms, thereby preventing the larger part of the current from passing therethrough.

Assume now, that the transmitting operator has dialed the secondary or units digit 7.

The first secondary dial signal pulse applies the ground 143a through the number 2 armature of the relay 164 and its *b* contact to the common terminal between the resistances 155 and 156 thereby shunting the circuit of the selector magnet 16A, and causing it to deenergize releasing the selector arm 49A to drop down to the next succeeding position on the lower ring. When the relay 141 returns to its energized condition, attracting its armature 142, current then flows from the battery 144 through the selector arm 49A and the conducting ring 28A, its outer conductor 166 to the common terminal between the resistances 156 and 157 from which the entire amount flows into the circuit of the selector magnet 16A to again energize it, actuating the armature 57A whereby the selector arm 49A steps up to the next position on the upper ring. A succeeding series of received pulses causes the secondary selector arm 49A to step seven steps in a counter-clockwise direction until it engages the annunciator contact 52A. In this position of the selector arm 49A the current is conducted from the battery 144 through the resistance 162, spring 70A, the shaft 60A, the selector arm 49A, the contact 52A, and the resistance 94A which is of the order of a megohm to charge up the .25-microfarad condenser 95A connected in parallel with the 270,000-ohm resistance 96A. When the condenser 95A has become charged to a sufficiently high potential, the gap between the electrodes 98A and 99A of the tube 101A breaks down, ionizing the main gap of the tube 101A between the electrodes 99A and 100A thereby furnishing a path for current to pass through the 2,000-ohm resistance 102A and across the secondary gap between the electrodes 100A and 98A to ground 104A, whereby the tube remains energized even after the selector arm 49A has been returned to its home position by a steady carrier pulse, as described above. The resistance 102A is of the order of 2,000 ohms, while the bleeder resistance 105A is of the order of 200,000 ohms. The presence of the timing circuit comprising condenser 95A and resistance 96A to ground 97A which has a definite charging period prevents the annunciator circuits from being operated in those local stations in which the annunciator contacts lie in some position on the upper ring between the home position 86A and the contact 52A of the called station, and are, therefore, passed over the selector arm 49A as it steps to the called position in response to dialed pulses. The subscriber notes the energized condition of the vacuum tube 101A and is thus informed that a message is awaiting him. In order to permit the tube 101A to deenergize, the subscriber depresses the key 107A.

A disconnect signal in the form of a long space pulse of the order of about 1 second from the transmitter deenergizes the relay 141 and returns the selector mechanisms to their respective home positions as follows: The ground 143a is applied through the number 2 armature of the relay 164 and its *b* contact thereby shunting the circuit of the secondary selector magnet 16A as described hereinbefore. The selector arm 49A is released from its locked position, dropping down to the next succeeding step in contact with the lower ring 28A. Current then passes from the battery 144 through the selector arm 49A, and ring 28A and its outer connection 166 to the common terminal between the nearly equal resistances 156 and 157 where it divides, half passing through the armature 2 and its *b* contact to the ground 143*a* which is held engaged to armature 142 by the steady transmitted signal. The other half of the current passes through the resistance 157 to energize the circuit of the selector magnet 16A, thus actuating the selector arm 49A to step up to the next succeeding contact on the upper ring. This operation is repeated as long as the steady transmitted signal deenergizes the relay 141 and until the selector arm 49A has reached contact 165 on the upper level. Current from the battery 144 then passes through the resistance 162, the spring 70A, shaft 60A, selector arm 49A, contact 165, cut-off relay 163, the number 1 armature of the relay 164 and its *b* contact, to the right-hand terminal of the resistance 157, and into the circuit of the selector magnet 16A which is energized thereby holding the selector arm 49A in position. The cut-off relay 163 becomes energized by the operation just described, actuating its number 1 contact thereby breaking the circuit of the relay 164 to its battery source 144.

When the relay 164 deenergizes, all of its armatures again return to their normal positions as shown in Fig. 2. The number 1 armature breaks its contact *b* thereby opening the circuit of the cut-off relay 163 and simultaneously breaking the circuit of the selector magnet 16A causing it to release the selector arm 49A to drop down to its home position 172, 172' on the lower ring.

When the disconnect signal ceases and the relay 141 returns to its normal energized state attracting its armature 142, the primary selector arm 49B is then actuated to move from its resting position 171 to the starting position 86B as follows: Current passes from the battery 144 through the resistance 161, the spring 70B, through the selector arm 49B, contact 171, the number 5 armature and its *a* contact of the relay 164, the armature 142 and contact 143*b* of the relay 141 in the normal or energized position, and the number 2 armature of the relay 164 and its *a* contact, to the terminal between the resistances 150 and 151 from which it passes into the circuit of the selector magnet 16B, energizing it and causing the selector arm 49B to be actuated and locked-operated over contact 86B and resistances 150, 151 and 152 to the winding of the relay 16B to ground 147.

As in the previously described circuits the subscribing operator may extinguish the tube 101A by pressing the release key 107A after he has been notified of the message.

Should the car battery supply be interrupted such as would occur in charging the battery, turning off the radio receiver or dropping the terminal voltage below the minimum operating voltage for this unit by operation of the starter switch, the primary selector arm 49B would be caused to release but the remainder of the circuit would be unaffected. Whenever the power supply should be restored to a closed circuit condition or the voltage restored to normal the primary selector arm 49B would reoperate to the next position away from the selector home contact. However, by means of steady signal transmitted by the calling transmitter prior to dialing, the primary selector arm 49B would be returned to its home position, the possibility of wrong selections being thus eliminated.

Fig. 3 shows an alternative circuit for subscriber's units in which cold cathode tubes are utilized. For use in receiving systems of the type here shown, the transmitted calling carrier wave is modulated by means of an audio tone of three or four thousand cycles per second. Unlike the receiving system of Fig. 2 the system of Fig. 3 is designed to respond to mark pulses.

As disclosed, the circuit of Fig. 3 is adapted for use in a calling system in which the code numbers have a single digit. If it is desired to utilize a receiving system of the type disclosed in Fig. 3 in a calling system in which the code designations have two or more digits, a number of selectors corresponding to the required number of digits are placed in cascade as taught in the disclosure of Fig. 2. It will likewise be apparent to those skilled in the art that the circuit of Fig. 2 may be adapted for single digit reception by removing the secondary selector from the circuit, or such circuit may be adapted for receiving codes having a large number of digits by merely adding the required number of selectors in cascade.

Assume that the selector arm 49C is at its home position 93C ready to respond to an incoming call. The transmitting operator dials the number of the called station, in the case of the circuit under description, a single digit, which will be assumed to be 8.

The first pulse of modulated calling carrier current raises the potential of the electrode 135 of the cold cathode tube 133 to such a value that the secondary gap between the electrodes 135 and 136 is rendered conducting, thus permitting current from the battery 121 to pass through the resistance 122, spring 70C, the shaft 60C, the selector arm 49C which is resting on the home contact 93C, and across the main gap between the electrodes 136 and 137 to energize the circuit of the selector magnet 16C. The selector arm 49C is thereby actuated to step up to the starting position 86C on the upper ring of contacts. As soon as engagement of the contact 93C by the selector arm 49C is broken, the tube 133 is again rendered non-conducting. The selector arm 49C is locked on position 86C as follows: Current flows from the battery 121 through the resistance 122, spring 70C, shaft 60C, selector arm 49C, contact 86C, resistances 124 and 125 to energize the selector magnet 16C. As in Fig. 2 above, the function of the condenser 129 is to prevent buzzer action of the selector magnet 16C. The next modulated pulse of carrier wave raises the potential of the electrode 118 of the tube 116, rendering the primary gap between the electrodes 117 and 118 conducting whereby current is permitted to pass across the secondary gap 117, 119 to ground 120 thereby shunting the circuit of the selector magnet 16C. The selector arm 49C then drops down to contact the lower ring 28C, momentarily breaking the circuit of the battery 121, whereby the tube 116 is again rendered non-conducting. When the selector arm 49C is in position on the lower ring current passes from the battery 121 through the resistance 122, spring 70C, the ring 28C, around through its outer connection 123 to the resistance 125, to energize the circuit of the selector magnet 16C, which immediately actuates its armature 57C causing the selector arm 49C to step up to the next position on the upper ring of contacts. As before, the selector arm 49C is locked in position against the upper contact, current passing from the battery 121 through resistance 122, spring 70C, the shaft 60B, the selector arm 49C, contact 54C, resistances 124 and 125, to the circuit of the selector magnet 16C. Each succeeding pulse renders the tube 116 conducting, shunting the circuit of the selector 16C and causing the selector arm 49C to move around the comb of teeth, a number of steps corresponding to the number of received pulses.

In each subscribing station, the selector arms are thus synchronously stepped around in response to transmitted pulses. In the particular subscriber station called, on the eighth pulse the selector arm 49C is locked in engagement with the annunciator contact 52C. Current then passes through the resistance 94C, which is of the order of a megohm, to charge up the condenser 95C connected in parallel with the resistance 96C to ground 97C. With the exception of the 1-megohm resistance 139 and the 56-ohm resistance 140, which have been added to bring the electrodes of the tube 101C to the correct potentials, the signal or annunciator circuit shown in Fig. 3 is similar to the one shown in Fig. 2, and operates in the manner described above to energize the signal lamp 101C in the called station.

The selector arms in the subscribing circuits of the type of Fig. 3 are returned to their home positions 171, 171' in response to a steady mark signal of modulated carrier which is received from the calling transmitter, and detected and amplified by the conventional receiving equipment 173. Alternating current of the audio modulated frequency passes through the condenser 108 and the primary coil 109 of the transformer 110. Alternating current induced in the secondary coil 111 circulates in a circuit tuned to the modulating frequency which includes the ground 112, variable resistance 113, coil 111, the .005 microfarad condenser 114, and ground 115. Thus, for the duration of the steady carrier pulse, the potential of the electrode 118 of the cold cathode tube 116 which is connected to the common terminal of the resistance 134 and the condenser 114, is raised by the IZ drop through the aforesaid circuit. The gap between the electrodes 117 and 118 of the tube 116 is thereby rendered conducting. Current then passes from the battery 121 through the 200-ohm resistance 122, spring 70C, the shaft 60C, the selector arm 49C, one of the contacts 54C to the common terminal between the 6,300-ohm resistance 124 and the electrode 117 of the tube 116. From this point all but an inappreciable amount of the current passes through the tube 116 across the secondary gap 117, 119 to ground 120, thereby shunting out the circuit of the electromagnet 16C and causing it to be deenergized. The electromagnet 16C then releases its armature 57C', wherby the selector arm 49C drops down to the lower comb, making contact with the conductor ring 28C. Current then flows from the battery 121 through the resistance 122, the spring 70C, the shaft 60C, the selector arm 49C, the lower ring 28C, through its outer connection 123 to the resistance 125 to again energize the circuit of the selector magnet 16C. The relative magnitude of the resistance 124, 6,300 ohms, is such compared to that of the resistance 125, 680 ohms, as to prevent an appreciable amount of the battery current from taking a path through the tube 116, which remains conducting for the duration of the modulated carrier pulse. Thus energized, the selector magnet 16C again attracts its armature 57C' whereby the selector arm 49C is moved up to the next succeeding position on the upper circle of contacts. As soon as the selector arm 49C is again in position on the upper ring, it engages one of the contacts 54C, whereby current again flows from the battery 121, through the resistance 122, spring 70C, the shaft 60C, selector arm 49C and contact 54C to the electrode 117 of the tube 116, through which it passes to ground 120 across the gap 117, 119, again shunting the selector magnet 16C, thereby again causing the selector arm 49C to drop down to the next succeeding position on the lower ring. This operation is repeated for the duration of the steady modulated carrier signal until the selector arm 49C reaches the home contact 93C on the lower ring. Current from the battery 121 then flows through the resistance 122, spring 70C, and the selector arm 49C, the contact 93C, through the 2500-ohm bleeder resistance 131 to ground 132. Tube 133 will not become conducting for the duration of the steady pulse of modulated carrier wave, during which the tube 116 remains conducting. When the steady pulse ceases, the tube 116 is rendered nonconducting, permitting the tube 133 to again become conducting. The arm 49C remains on the home contact until the pulsed dial signals indicating the next call are received from the calling transmitter, as described hereinbefore.

Figs. 4 and 5 disclose circuits in which conventional receiving equipment is utilized as part of the subscriber's unit in a selective calling system. In each case, a circuit tuned to the selective service calling carrier frequency receives a signal from the selective service calling transmitter which automatically causes standard broadcast reception to be discontinued, and call reception initiated in its stead.

Operation of the circuit of Fig. 4 is as follows: A radio frequency signal is received through the antenna 274, causing a voltage drop in the primary coil 275 of the transformer 276 which is connected to ground 279. Eletromotive forces are accordingly induced in the secondary coils 277 and 278. Assume that the variable condenser 287 is tuned to some frequency in the broadcast range. A signal of that particular frequency is then fed from the tuned circuit into the radio frequency stage of the receiver 289 which may be of any well-known type, but which is preferably of a type suitable for use in motor vehicles and trucks. The output of the audio stage of the radio receiver 289 is connected to a conventional loudspeaker or other message translating device 290.

If a signal of calling carrier frequency is received, a large enough electromotive force is induced in the circuit comprising the secondary coil 278 in parallel with the condenser 280, which is tuned to the selective service calling carrier frequency, to render the primary gap between the electrodes 281 and 282 of the cold cathode tube 284 conducting. The secondary gap between the electrodes 281 and 283 of the tube 284 is thereby also rendered conducting so that current is caused to pass from the battery 285 around through the windings of the relay 286. The number 1 armature of the relay 286 is actuated to break its *a* contact and engage its *b* contact causing the variable condenser 287 to be disconnected from the radio receiver 289, and the fixed condenser 288 which tunes the receiver circuit to the calling carrier frequency to be substituted in its stead.

Simultaneously, the number 2 armature of the relay 286 is operated to break its *a* contact and engage its *b* contact, thereby disconnecting the loudspeaker 290 from the output of the receiver 289, and replacing it with the relay 291, the armature and contact of which closes the selector control circuit 292 to cause the selector 293 to step around in accordance with received pulses of modulated calling carrier frequency, lighting a signal device 294 such as a lamp, if the particular subscriber's station under discussion is the one called by the calling transmitter.

By pressing the release button 295 after each selector operation, thereby causing the tube 283 to be deenergized, the circuit is put in condition for reoperation. This operation could easily be accomplished automatically by connecting the release button so as to be operated at a designated selector step. By means of the release button 295, the selector unit may also be disconnected entirely so that broadcast reception is not interfered with. The selector device is preferably but not necessarily of the type hereinbefore described, and the selector control circuit is preferably of one of the types described with reference to Figs. 2 and 3.

In Fig. 5, an alternative circuit is shown schematically in which broadcast reception is automatically cut off and selective service call reception substituted.

According to the embodiment shown, the audio frequency circuit 296 which is continuously energized may be connected alternatively to either of two radio frequency circuits, 300 or 302. For normal broadcast reception, the audio frequency circuit 296 is connected through the armature 298 of the relay 297 and its *a* contact to the radio frequency circuit 300, which receives conventional broadcast signals through its antenna 301.

Another radio frequency circuit 302 is at all times tuned to receive selective service calling carrier signals through its antenna 303. Signals received from the calling transmitter through circuit 302 are conducted to the selector control circuit 304 through which the step-by-step selector 305 is caused to operate a number of steps corresponding to the number of received pulses. The selector 305 is preferably but not necessarily of the type shown in Figs. 1, 2 and 3 of the drawings and described hereinbefore with reference thereto. If the particular subscribing station therein described is the one called by the calling transmitter, the selector arm 306 steps around to the contact 307, thereby completing the circuit to ground 309 so that the relay 297 is energized by the power source 299. The relay 297 then actuates its armature 298 to break its *a* contact and close its *b* contact, whereby the audio frequency circuit 296 is disconnected from the standard broadcast radio frequency circuit 300 and is connected in its stead to the radio frequency circuit 302. Voice modulated signals of calling carrier frequency are then conducted from the radio frequency receiving circuit 302 through the armature 298 of the relay 297 and its *b* contact to the audio frequency circuit 296 where such signals are detected and audio-amplified before passing into the loudspeaker 308. It is thus possible for voice messages from the selective service calling carrier transmitting station or a steady tone to be heard through the loudspeaker 308 at the subscribing station. Upon completion of the message from the calling carrier transmitter, release of the relay 297 will restore the connection between the audio frequency circuit 296 and the broadcast radio frequency circuit 300, so that broadcast reception again takes place automatically.

As an alternative to the gas-filled tube utilized as a signaling or annunciator device in the embodiments of the selective signaling system hereinbefore shown and described, any one of the following devices might be used to indicate a call to the subscriber:

(1) A buzzer;

(2) An ink recorder of type similar to a pen register;

(3) A printer for receiving teletypewriter messages, thereby eliminating the need for a telephone call to the paging service transmitting station;

(4) A recorder by means of which the message could be recorded on film and played back at a centralized point; and (5) A small motor-driven printing type wheel, having an approved message inscribed on it to call the paging service.

In the last-mentioned device, the wheel would be actuated on seizure by the selector and the printed tape wound on a tape reel.

Although the Albert-type selector mechanism has been shown and described with reference to several of the embodiments of the invention shown herein, other types of step-by-step selector units can be employed alternatively.

It is to be understood that this invention is not limited to any particular embodiment shown, or to any particular piece of apparatus used by way of illustration.

What is claimed is:

1. In a radio calling system, a call transmitting circuit comprising in combination a step-by-step selector mechanism which comprises a series of contacts positioned to represent digits in the designating numbers of respective subscribing stations, a home contact, a selector magnet, a selector arm magnetically responsive to said magnet and arranged to engage said contacts in succession, and a signal device associated with said selector to indicate the arrival of the selector arm at a designated contact, a source of power connected to said selector magnet, dialing means for producing a number of interruptions in the circuit of said power source in accordance with the number dialed, said selector mechanism arranged to move through a number of steps corresponding to the number of said dial pulses, a radio transmitting circuit, relay means in circuit relation with said selector mechanism and said transmitting circuit to cause radio signals to be transmitted in accordance with the stepping of said selector, a timing circuit, relay means in circuit relation with said timing circuit and said transmitter to modulate the output of said transmitter with a steady signal enduring for a predetermined interval, and relay means in circuit relation with said selector for returning said selector arm to home position from a previously dialed position.

2. In a radio calling system, a call transmitting circuit comprising in combination a step-by-step selector mechanism which comprises a series of contacts positioned to represent digits in the designating numbers of respective subscribing stations, a home contact, a selector magnet, a selector arm magnetically responsive to said magnet and arranged to engage said contacts in succession, and a signal device associated with said selector to indicate the arrival of the selector arm at a designated contact, a source of power connected to said selector magnet, dialing means for producing a number of interruptions in the circuit of said power source in accordance with the number dialed, said selector mechanism arranged to step in accordance with said dial pulses, a radio transmitting circuit, relay means associated with said selector mechanism and said transmitting circuit to cause radio signals to be transmitted in accordance with the stepping of said selector, a timing circuit, relay means associated with said timing circuit and said transmitter to cause the radio output of said transmitter to be modulated with a steady signal during a predetermined interval, relay means in circuit relation with said selector mechanism and said timing circuit to condition said selector mechanism for reoperation a designated elapsed time after each dial operation, thereby permitting the transmission of a number of separate trains of radio signals corresponding to the number of digits in the designating numerals of the subscribing stations, and relay means in circuit relation with said selector for returning said selector arm to home contact from a position of the previously dialed digit.

3. In a radio calling system, a call annunciator comprising in combination receiving means selectively tunable to the calling carrier frequency, a circuit electrically associated with said receiving means which includes a magnetic selector having a plurality of contacts including a home contact, an electromagnet, and a selector arm magnetically responsive to said magnet and arranged to successively engage said contacts, said selector magnet disposed in circuit relationship with relay means and a source of power, said relay means arranged to recurrently deenergize said selector magnet causing said selector arm to move in successive steps corresponding to the received signals of calling carrier frequency, indicator means associated with a designated contact on said selector and so arranged that operation thereof is initiated when said selector arm is in engagement with said designated contact, relay means in circuit relation with said selector and operative in response to a steady calling carrier signal to cause said selector arm to return in successive steps to the home contact, and means connected to said indicator for releasing said indicator means from operation.

4. In a radio calling system, a call annunciator comprising in combination receiving means selectively tunable to the calling carrier frequency, a circuit electrically associated with said receiving means which includes a magnetic selector having a plurality of contacts including a home contact, an electromagnet, and an arm magnetically responsive to said magnet and arranged to successively engage said contacts, a source of power associated with said selector magnet, a first electron discharge device disposed in circuit relationship to said electromagnet, means to cause said first electron discharge device to be rendered conducing upon receipt of an initial signal from said transmitter causing said selector mechanism to operate through an initial step, means for causing said first electron discharge device to become inoperative, a second electron discharge device disposed in circuit relationship to said electromagnet, means to cause succeeding signals from said transmitter to render said second electron discharge device conducting, said second electron discharge device being arranged to shunt said selector magnet causing said selector magnet to become recurrently deenergized releasing said selector arm to move in successive steps corresponding to the said received signals, indicating means associated with a designated contact on said selector and so arranged that operation thereof is initiated when said selector arm is in engagement with said designated contact, and relay means in circuit relation with said selector to cause said selector arm to return in successive steps to home position upon receipt of a steady calling carrier signal.

5. A selector mechanism comprising in combination an electromagnet, a dial having a plurality of contacts, a rotatable arm mechanically coupled to said magnet and arranged to engage said contacts in succession, a source of power, said electromagnet being connected to said source of power whereby the energization of said magnet causes said selector arm to move into a locked stationary position, an electron discharge device disposed in circuit relationship with said source of power and with said electromagnet to shunt said electromagnet whenever said electron discharge device is rendered conductive, thereby deenergizing said electromagnet and releasing said selector arm for further operation.

6. A selector mechanism comprising in combination a plurality of contacts, a rotatable arm positioned so as to engage said contacts in succession, an electromagnet disposed to magnetically actuate said selector arm, a source of power connected to said electromagnet, means responsive to an initial electrical signal to cause said selector magnet to be initially energized forcing said selector arm into locked engagement with one of said contacts, means comprising an electron discharge device connected in shunt with said electromagnet and responsive to signals after said initial signal to deenergize said electromagnet thereby releasing said selector arm for reoperation, relay means connected to said power source for subsequently reenergizing said selector magnet and thereby reoperating said selector arm to the next succeeding selector position.

7. In a calling system including a transmitter adjusted to transmit pulsed signals of carrier frequency in a predetermined time relationship, receiving means selectively tunable to said carrier frequency, a circuit electrically associated with said receiving means, said circuit comprising a selector with a plurality of contacts including a home contact, selector magnet, and a selector arm magnetically responsive to said selector magnet, said selector magnet disposed in circuit relationship with relay means and a source of power, said relay means responsive to said transmitted pulsed signals to recurrently deenergize said selector magnet causing said selector arm to move in successive steps corresponding to said received pulsed signals, indicating means electrically connected to a designated contact on said selector, operation of which is initiated when said selector arm is in engagement with said indicator contact, relay means in circuit relation with said selector and operative in response to a steady calling carrier signal to cause said selector arm to return in successive steps to the home position upon cessation of transmitter pulsed signals, and means connected to said indicator for releasing said indicator means from operation.

8. In combination, a calling means which includes a transmitter adjusted to send pulsed signals of designated carrier frequency in an alterable predetermined time relationship, receiving means selectively tunable to said carrier frequency, a circuit electrically associated with said receiving means, said circuit comprising a magnetic selector having a plurality of contacts, an electromagnet, and an arm arranged to successively engage said contacts and magnetically responsive to said magnet, a source of power, a first electron discharge device in circuit relationship with said selector magnet, means associated with said first electron discharge device to cause first electron discharge device to be rendered conducting upon receipt of an initial pulsed signal from said transmitter actuating said selector arm to operate through an initial step, means causing first said electron discharge device to become inoperative, a second electron discharge device in circuit relationship with said selector magnet, means associated with said second electron discharge device to cause succeeding pulsed signals from said transmitter to render said second electron discharge device conducting, said second electron discharge device being arranged to shunt said selector magnet causing said selector magnet to become recurrently deenergized releasing said selector arm to move in successive steps corresponding to said received pulsed signals, indicating means electrically connected to a designated contact on said selector, a source of power electrically connected to said indicating means, said indicating means adapted to operate when said indicator contact is in engagement with said selector arm, and means connected to said selector mechanism and responsive to a steady carrier signal for returning said selector arm to home position, and means connected to said indicator for releasing said indicator means from operation.

9. A radio calling system which comprises in combination a transmitter adapted to transmit a series of pulsed signals, means connected to said transmitter for arranging the number and duration of said pulsed signals in accordance with one of a plurality of codes, said transmitter adapted to transmit a first continuous radio signal of predetermined duration preceding said series of pulsed signals and a second continuous radio signal of predetermined duration succeeding said series of pulsed signals, a plurality of selective signal receiving means responsive to said first continuous signal of said transmitter to move step-wise to the normal position for operation, each said receiving means responsive to the pulsed signals of said transmitter to move stepwise through a series of positions, each said receiving means responsive to a particular pulsed signal in accordance with one of the codes of said transmitter to actuate the annunciator device attached thereto, and each said receiving means responsive to said second continuous signal of said transmitter to return step-wise to the normal position for reoperation.

10. In a radio calling system, a call annunciator comprising in combination a radio receiver, a message translating device disposed in circuit relation to said receiver and responsive to the output of said receiver, means for tuning said receiver to any one of a plurality of frequencies within a given range of carrier frequencies, a step-by-step selector mechanism adapted to move through a series of positions, an indicating device connected to a preselected one of said positions, electronic means operative in responsive to signals of predetermined calling carrier frequency to replace said message translating device by said selector mechanism in circuit relation to and responsive to the output of said receiver, means responsive to calling signals received by said receiver to operate said selector mechanism, and means responsive to the engagement of said selector mechanism with said preselected position to operate said indicating device.

11. In a radio calling system, a call annunciator comprising in combination a radio receiver, a message translating device disposed in circuit relation to said receiver and responsive to the output of said receiver, means for tuning said receiver to any one of a plurality of frequencies within a given range of carrier frequencies, a step-by-step selector mechanism adapted to move through a series of positions, an indicating device connected to a preselected one of said positions, means responsive to a remotely controlled signal for replacing said message translating device by said selector mechanism in circuit relation to and responsive to the output of said receiver, means responsive to calling signals received by said radio receiver to operate said selector mechanism and means responsive to the engagement of said selector mechanism in said preselected position to operate said indicating device.

12. In a radio calling system, a call annunciator comprising in combination a conventional radio receiver having a first radio frequency circuit tunable to any of a plurality of broadcast frequencies within a given range of frequency and an audio frequency circuit, a message translating device responsive to the output of said audio frequency circuit, a second radio frequency circuit tuned to signals of a predetermined calling carrier frequency, a step-by-step selector mechanism adapted to step through a series of positions, a control circuit connected to said selector and adapted to operate said selector through said series of positions in response to calling carrier signals received by said second radio frequency circuit, means responsive upon said selector engaging a predetermined one of said positions to replace said first radio frequency circuit by said second radio frequency circuit in said radio receiver, whereby said audio circuit and said message translating device operate in response to further signals of calling carrier frequency received by said second radio frequency circuit.

EDWARD PRAIZNER.

REFERENCES CITED

The following references are of record in the file of this patent:

UNITED STATES PATENTS

| Number | Name | Date |
|---|---|---|
| 1,140,378 | Kleinschmidt | May 25, 1915 |
| 1,522,581 | Espenschied | Jan. 13, 1925 |
| 1,657,498 | Demarest et al. | Jan. 31, 1928 |
| 1,662,877 | Almquist | Mar. 20, 1928 |
| 1,900,499 | Hershey | Mar. 7, 1933 |
| 2,049,319 | Rich | July 28, 1936 |
| 2,053,704 | Drake et al. | Sept. 8, 1936 |
| 2,063,354 | Thorp | Dec. 8, 1936 |
| 2,082,123 | Samuel | June 1, 1937 |
| 2,116,372 | Weld | May 3, 1938 |
| 2,129,740 | Lewis | Sept. 13 ,1938 |
| 2,201,561 | Norrito | May 21, 1940 |
| 2,289,517 | Muehter | July 14, 1942 |
| 2,365,284 | McClelland | Dec. 19, 1944 |
| 2,384,558 | Potts | Sept. 11, 1945 |
| 2,397,881 | Nitterauer | Apr. 2, 1946 |